United States Patent [19]

Romey et al.

[11] Patent Number: 4,764,355
[45] Date of Patent: Aug. 16, 1988

[54] PROCESS FOR REMOVAL OF SOLID AND GASEOUS NOXIOUS MATTER FROM HOT GASES

[75] Inventors: Ingo Romey, Hünxe; Erwin Ahland; Reinhard Pass, both of Essen; Franz Verfuss, Recklinghausen, all of Fed. Rep. of Germany

[73] Assignee: Bergwerksverband GmbH, Essen, Fed. Rep. of Germany

[21] Appl. No.: 42,947

[22] PCT Filed: Jul. 29, 1986

[86] PCT No.: PCT/EP86/00447
§ 371 Date: May 15, 1987
§ 102(e) Date: May 15, 1987

[87] PCT Pub. No.: WO87/01050
PCT Pub. Date: Feb. 26, 1987

[30] Foreign Application Priority Data

Aug. 16, 1985 [DE] Fed. Rep. of Germany ....... 3529272

[51] Int. Cl.[4] .............................................. B01J 8/00
[52] U.S. Cl. ...................................... 423/244; 55/73; 55/97; 55/304
[58] Field of Search ................... 55/68, 73, 74, 96, 97, 55/278, 300, 304; 423/244 R, 244 A

[56] References Cited

U.S. PATENT DOCUMENTS

| 4,269,613 | 5/1981 | Miko et al. |
| 4,372,927 | 2/1983 | McCullough ................. 423/244 A |
| 4,512,787 | 4/1985 | Mathews ............................. 55/284 |
| 4,533,532 | 8/1985 | Gebhard et al. ............... 423/244 A |
| 4,581,210 | 4/1986 | Teller .......................... 423/244 A X |
| 4,609,539 | 9/1986 | Hnecky et al. ................. 423/244 R |

FOREIGN PATENT DOCUMENTS

| 2330234 | 1/1974 | Fed. Rep. of Germany . |
| 2327020 | 1/1975 | Fed. Rep. of Germany . |
| 2706938 | 8/1978 | Fed. Rep. of Germany . |
| 2900705 | 7/1980 | Fed. Rep. of Germany . |
| 3009986 | 10/1980 | Fed. Rep. of Germany . |
| 2823976 | 6/1983 | Fed. Rep. of Germany . |
| 3304344 | 8/1984 | Fed. Rep. of Germany . |

OTHER PUBLICATIONS

"Filterende Staubabscheidung für Kohlefeuerkessel", by W. Schultess, published in BWK, vol. 36 (1984) No. 10, Oct.

*Primary Examiner*—Charles Hart
*Attorney, Agent, or Firm*—Herbert Dubno

[57] ABSTRACT

Metal candle-type gap filters are used to remove particles from a hot gas stream containing sulfur oxides so that, in the filter cake which is built up upon the candle filters, the sorption reaction can continue as the hot gas stream passes through the filter.

5 Claims, 3 Drawing Sheets

PROCESS FOR REMOVAL OF SOLID AND GASEOUS NOXIOUS MATTER FROM HOT GASES

CROSS REFERENCE TO RELATED APPLICATIONS

This application is a National phase application corresponding to PCT/EP86/00447 filed July 29, 1986 and based, in turn, on a German National application P 35 29 272.5 filed Aug. 16, 1985.

FIELD OF THE INVENTION

This invention relates to a process for the simultaneous removal of solid and gaseous noxious matter from hot sulphur-containing gases, by means of filters on which a filter cake is deposited.

BACKGROUND OF THE INVENTION

It is known that dust removal by filtration can also be used for desulphurization. In that case alkaline additives such as calcium hydroxide are added to the gas stream in order to bind sulphur oxides (W. Schulteβ, Brennstoff-Wärme-Kraft, Vol. 36 (1984), No. 10, p. 420–426). After reaction, these additives must be removed, together with the dust, from the gas stream. To this end, fabric filters are used so that filtration takes place within and on the forming filter cake. It has been found that the reaction of $Ca(OH)_2$ with $SO_2$ is substantially boosted by continued reaction in the filter.

In fabric filters, however, an irreversible deposit of ultrafine particles in the filter fabric takes place (irreversible partial plugging). The resulting high pressure drop and high cleaning-cycle frequency result in excessive wear. Furthermore, the known fabric filters can only be run at operation temperatures of up to approx. 250° C. (W. Schulteβ, Brennstoff-Wärme-Kraft, Vol. 36 (1984), No. 10, p. 422), and in particular in case of high solids concentrations, an upstream preliminary separation step may become necessary.

OBJECT OF THE INVENTION

The object of the invention is to improve methods of separating solid and gaseous noxious matter from hot gases in a way that the above mentioned draw-backs as well as the necessity of a preliminary separation step are avoided.

SUMMARY OF THE INVENTION

This object is achieved in accordance with the invention by cycling the hot gases loaded with solid and gaseous noxious matter through a filtration unit with metallic gap-type candle filters.

Such filtration units with metallic gap-type candle filters are known from filtration of liquid matter (DE-PS 28 28 976, DE-OS 27 06 938). With gap-type candle filters, irreversible partial plugging does not take place. The possible filtration time is controlled exclusively by the permeability of the building-up filter cake. Preliminary dedusting, previously necessary in case of high solids loads, is not necessary. Temperature- and corrosion-conditioned limitations to the use of metallic gap-type candle filters can be overcome by purposeful material selection, so that the process covered by this invention is particularly well suited for separations run at high temperatures. The gap-type candle filters of the most preferred type have gap widths in the range between 0.05 and 0.15 mm.

The adhesion of the filter cake to the surface of a gap-type candle filter is low, so that the cake can be removed simply and rapidly. For this reason, gap-type candle filters are particularly suited for processes in the course of which additives for binding gaseous noxious matter are added, because the additives must be removed from the gas stream, and this constitutes an additional task for the filtration process.

As additives, we can use substances which bind gaseous noxious substances by chemical reaction (chemisorption) or matter which bind the gaseous components by adsorption (physisorption). Basic metallic compunds such as calcium hydroxide, calcium carbonate and ferric hydroxide as well as adsorbents such as activated carbon, activated coke, silicon oxide, aluminum oxide and aluminum silicates can be used. The additives have a particle size in the range between 0.05 and 0.3 mm. With this particle size we can ensure that the filter cake which is built up remains permeable to gas.

According to composition, temperature of the gas and the additives chosen for binding the gaseous noxious matter, the additive either is metered into the hot gas stream or, prior to filtration, is metered into the gap-type candle filters. In case of a combustion system, the additive can be proportioned directly into the firing. According to this invention the particle size of the additive is selected in a way that even when removing the finest solids a satisfactory permeability of the filter cake is maintained. The resulting lower pressure drop caused by the filter cake allows longer filtration cycles and greater thickness of the filter cake. The increase of the filter cake thickness means longer residence times of the gases in the filter cake. This increases removal of gaseous noxious matter by continued reaction with the additive.

The process according to this invention allows cleaning of hot gases as produced e.g. in firings, power stations, coal gasification processes, iron- and steel production as well as in cement- and limestone industries.

This process adheres to the statutory limits for dust- and sulphur-dioxide emissions of the firings, as stipulated by Technische Anleitung zur Reinhaltung der Luft (TA, German clear-air regulations).

BRIEF DESCRIPTION OF THE DRAWING

In the following the invention is described in detail by means of a drawing and some examples.

In the drawing.

SPECIFIC DESCRIPTION

Figure 1:
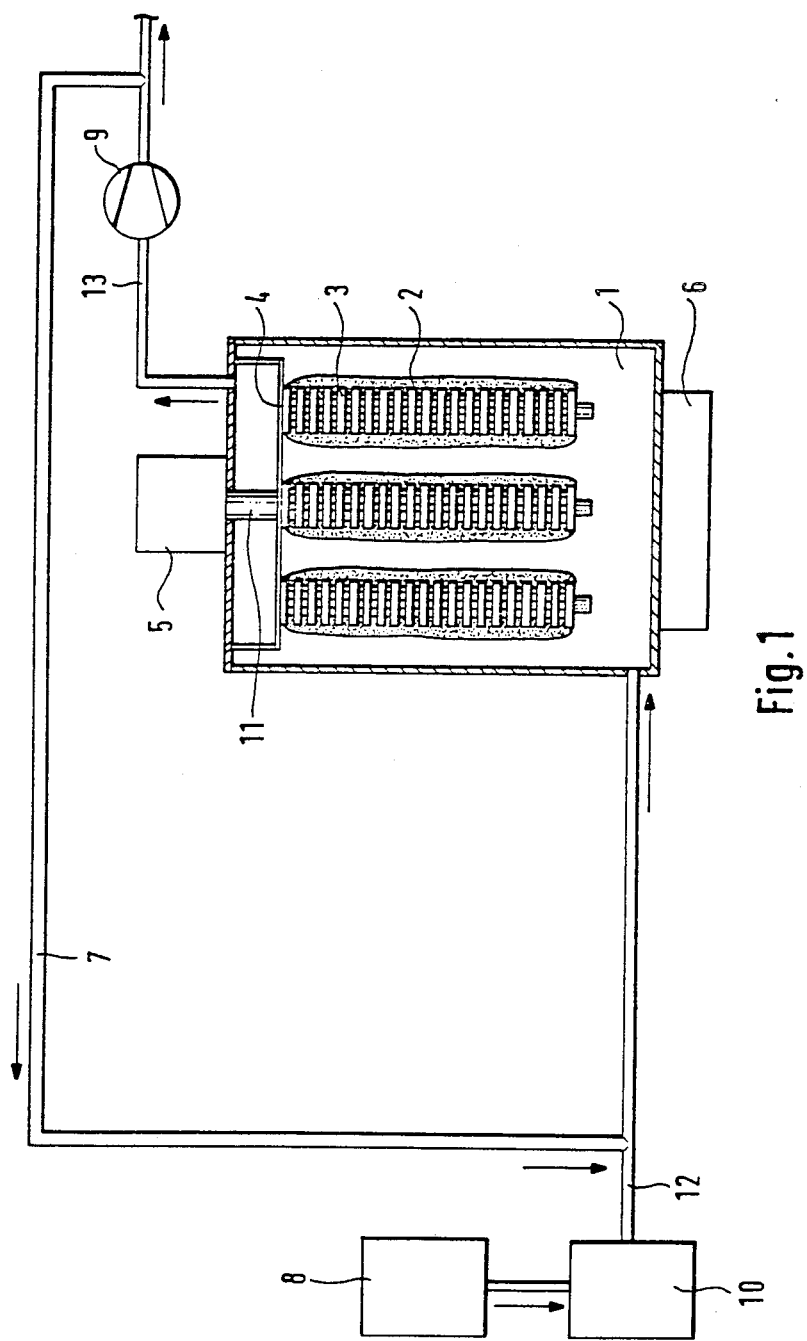
FIG. 1 is a flow diagram of the process for dedusting and partial desulphurization of combustion gases

From FIG. 1 is to be seen that an additive from a silo 8 is metered into a combustion chamber 10. Via a pipeline 12 the hot flue gas is cycled to the filtration unit 1. The filtration unit 1 comprises several vertically arranged gap-type candle filters 3 having a defined gap width, on which a filter cake 2 is deposited. The gap-type metal candle filters 3 are connected via a plate 4 with a pneumatic rapping system 5 with an impactor rod 11. Once a pre-set pressure drop is arrived at, the gap-type candle filters 3 can be cleanded by knocking off the filter cake 2. The filter cake 2 is removed through a lock-system 6. The gas, freed from solid and gaseous noxious matter, is withdrawn via a pipeline 13 and a fan 9 from the filtration unit 1. Until the build-up of the filter cake 2, in start-up operation, the still slightly polluted gas can be recycled to the filtration unit 1 via the recycling main 7.

Figure 2:
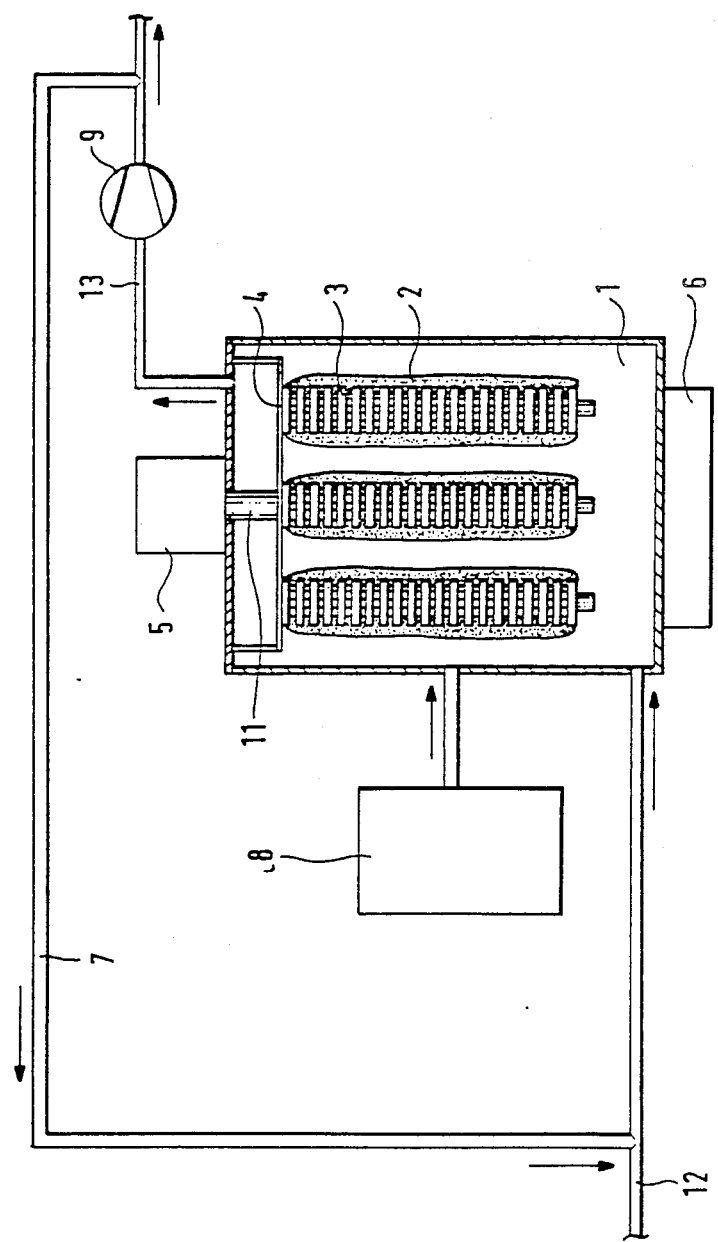
FIG. 2 is a flow diagram of the process during which the additive is metered into the gap-type candle filters prior to filtration.
Figure 3:
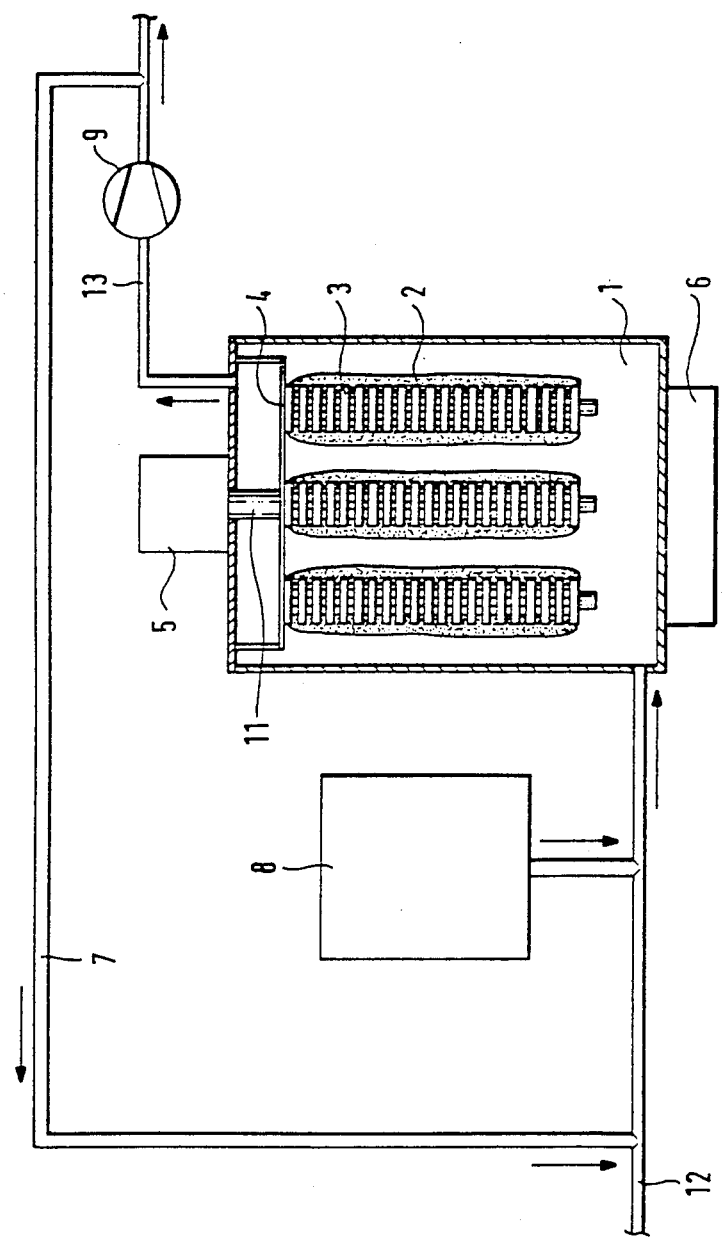
FIG. 3 is a flow diagram of the process in which the additive is proportioned to the gas stream.

In FIGS. 2 and 3 the reference numerals 1 to 13 have the same significance as in FIG. 1.

EXAMPLE 1

In an experimental plant as per FIG. 1 4.4% (relative to the coal feed) of calcium hydroxide ($Ca(OH)_2$) with a particle size in the range between 0.05 and 0.3 mm are metered from the silo 8 into the combustion chamber 10. This quantity corresponds to a double stoichiometric excess relative to the 1% of sulphur contained in the coal.

The flue gas is fed via the pipeline 12 to the filtration unit 1. The gas has a solids content of 10 g/m$^3$ and a temperature of 140° C. Without calcium hydroxide addition and solids removal being combined, the $SO_2$-concentration would amount to 1.7 g/m$^3$. At the beginning of the filtration period the pressure drop is 0.3 kPa. After recycling 15 m$^3$ of gas/m$^2$ of filtering surface through the filter, a thin filter cake 2 is built-up. This filter cake results in a dust removal efficiency of 99.5%. The still slightly polluted gas passing through the filter prior to sufficient cake build-up is recycled by the gas recycling main 7 to the filtration unit 1. The cleaned gas has an $SO_2$-content of 1 g/m$^3$ (41% desulphurization). During filtration the dust removal efficiency improves to a rate of 10 mg/m$^3$. After 1.5 h of filtration the filter cake thickness is 4 mm, and the pressure drop has increased to 0.9 kPa. By the rapping system 5 with impactor rod 11 the gap-type candle filters 3 are subjected to axial acceleration, so that the filter cake 2 breaks off and is removed completely from the gap-type candle filters 3. Via the lock system 6 the removed dust can be withdrawn. Subsequent pressure drop measurements on the unloaded gap-type candle filters 3 again yield a value of 0.3 kPa. Plugging of the gap-type candle filters 3 was not recorded during the subsequent removal cycles either.

EXAMPLE 2

A raw gas with an $H_2S$-concentration of 20 g/m$^3$, a solids content of 100 g/m$^3$, and a temperature of 550° C. is cycled to an experimental plant corresponding to FIG. 2. This gas can be the raw gas from a plant for pressurized coal gasification. Prior to operation on the raw gas the gap-type candle filters 3 were provided with an approximately 10 mm thick filter cake 2 of calcium hydroxide ($Ca(OH)_2$) with a particle size in the range between 0.05 and 0.25 mm. The flow velocity is 0.042 m/s. Once the pressure drop reaches 1.0 kPa, the filter cake 2 is removed. Due to the high solids content the cleaning cycle frequency is of 3 h$^{-1}$. With an average residence time of the gas in the filter cake 2 in the range between 0.1 and 0.2 s, an $H_2S$-concentration in the clean gas of 1 g/m$^3$ was achieved at 95% desulphurization). The solids content of the cleaned gas is 15 mg/m$^3$.

EXAMPLE 3

Raw gas as per Example 2 is blended with 35 g/m$^3$ of calcium hydroxide ($Ca(OH)_2$) having a particle size distribution between 0.05 and 0.25 mm, and cycled to an experimental plant as per FIG. 3. At a flow velocity of 0.05 m/s, filtration is run up to a pressure drop of 1 kPa. The cleaning cycle frequency is of 4 h$^{-1}$. The dust load the cleaned gas is less than 20 mg/m$^3$. The $H_2S$-concentration is reduced from 20 g/m$^3$ to 8 g/m$^3$ at 60% desulphurization.

EXAMPLE 4

A filtering layer made up from activated carbon with a particle size ranging from 0.05 to 0.3 mm is applied by clean gas, as shown in FIG. 2, to the gap-type candle filters 3, so that a 10 mm thick activated-carbon layer is built up. The flue gas as per Example 1 is then cycled through the filtration unit 1 at a flow velocity of 0.05 m/s. Once a pressure drop of 1.2 kPa is reached, the filter cake 2 is removed. The cleaning frequency is 0.5 h$^{-1}$. The $SO_2$-concentration the clean gas is 1 g/m$^3$ (40% desulphurization), and the solids content is 15 mg/m$^3$.

We claim:

1. A method of removing sulfur oxides from a hot gas stream, comprising the steps of:
   (a) providing a plurality of metallic candle filters in an upright orientation with a filter-gap width between 0.05 and 0.15 mm and suspended from a common support in a filter chamber;
   (b) feeding a hot gas stream containing sulfur oxides to said filter chamber;
   (c) treating said hot gas stream with at least one particulate additive selected from the group which consists of calcium hydroxide, calcium carbonate, ferric hydroxide, activated carbon, activated coke, silicon oxide, aluminum oxide and aluminum silicate and of a particle size between 0.05 and 0.3 mm to cause sorption of said sulfur oxides on particles of said additive;
   (d) depositing said particles in filter cakes on said candle filters and, upon the formation of said filter cakes, permitting said hot gas stream to flow through said filter cakes so that sulfur oxides in said gas stream react in a sorption reaction with the particles forming the filter cake; and
   (e) intermittently rapping said candle filters to remove filter cake therefrom and discharging from said chamber material from filter cake removed from said candle filters.

2. The method defined in claim 1 wheren said hot gas stream is treated with said particulate additive by depositing said particulate additive on said candle filters at least in part prior to the passage of said hot gas stream through said candle filters.

3. The method defined in claim 1 wherein said hot gas stream is treated with said particulate additive by metering said particulate additive into a combustion process in which said hot gas stream is produced as a flue gas before said hot gas stream enters said chamber.

4. The method define in claim 1 wherein said hot gas stream is treated with said particulate additive by metering said particulate additive into said chamber.

5. The method defined in claim 1 wherein said hot gas stream is recirculated through said candle filters to build up said filter cakes before hot gas from said stream is discharged free from particulates and sulfur oxides.

* * * * *